US006944214B1

(12) United States Patent
Gilbert (10) Patent No.: US 6,944,214 B1
(45) Date of Patent: Sep. 13, 2005

(54) SCHEDULED AUDIO MODE FOR MODEM SPEAKER

(75) Inventor: Timothy G. Gilbert, Vermillion, SD (US)

(73) Assignee: Gateway, Inc., Irvine, CA (US)

( * ) Notice: Subject to any disclaimer, the term of this patent is extended or adjusted under 35 U.S.C. 154(b) by 1138 days.

(21) Appl. No.: 08/920,541

(22) Filed: Aug. 27, 1997

(51) Int. Cl.[7] .............................................. H04B 1/38
(52) U.S. Cl. .................................................. 375/222
(58) Field of Search ................... 375/222; 340/825.44; 361/752; 368/10; 379/88.13, 93.29, 102.03; 395/157, 601, 822

(56) References Cited

U.S. PATENT DOCUMENTS

| 5,204,969 A | | 4/1993 | Capps et al. ................. 395/800 |
| 5,367,563 A | * | 11/1994 | Sainton .................... 379/93.29 |
| 5,553,123 A | * | 9/1996 | Chan et al. ............. 379/102.03 |

(Continued)

FOREIGN PATENT DOCUMENTS

JP           407297974 A   *  11/1995   ............ H04N/1/00

OTHER PUBLICATIONS

Webster's II New Riverside University Dictionary, 1988, p. 1057.*
"Arm Yourself", *InterVoice Inc. Advertisement*.
"BOCA", *Computer Telephony*, Videoconferencing, (Oct. 1996).
"Computer Telephony Demo 96 Fall", *Computer Telephony Demo Show*, Orlando, FL, (Oct. 30–Nov. 2, 1996).
"Computer Telephony Internet WWW Addresses", *Computer Telephony*, 151, (Oct. 1996).
"Intelligent Call Center–Solutions", *Computer Telephony*, LHS Communications Systems, Inc. Advertisement.
"Introducing Show N Tel 4.0 for Windows NT", *Brooktrout Technology Advertisement*.
"Multimedia Access", *Computer Telephony*, Videoconferencing, 134–136, (Oct. 1996).
"Pronexus", *Computer Telephony*, Money–Making Apps, 60, (Oct. 1996).
"Speech Master", *Computer Telephony*, Speech Soft, Inc. Advertisement : Speech Basic.
"Telephony Toolbox", *Computer Telephony*, Exepos Limited Advertisement.
"Timmy Telephony", *Computer Telephony*, Artisoft Inc. Advertisement.
"Top 10 Modems", *PC World*, 243, (Oct. 1996).
"Your Voice is Nothing Without it", *Computer Telephony*, VARs, (Oct. 1996).
Glossbrenner, A., et al., *The Complete Modem Handbook*, 1rst Edition, MIS:Press, New York, NY, 1–386, (1995).

*Primary Examiner*—Chieh M. Fan
(74) *Attorney, Agent, or Firm*—Schwegman Lundberg Woessner & Kluth (57) ABSTRACT

A modem speaker is activated and deactivated based on a user modifiable schedule. The user stores schedule information in a schedule table, the schedule information describing a modem setting and a time for that setting to take effect. An automatic scheduler programs either the system clock or a clock device associated with the modem with the interrupts. When each interrupt issues, it generates a modem control command to turn the modem speaker either on or off by controlling whether or not audio signals are sent to the speaker. Alternatively, each time the modem is accessed, the automatic scheduler checks the schedule to see if audio signals should be provided to the speaker. A user may override the automatic scheduler at any time. By using the scheduler, a user can identify time periods when the modem speaker is deactivated without having to remember to turn off the speaker, and have the speaker activated during all other periods with having to remember to turn the speaker back on.

25 Claims, 7 Drawing Sheets

U.S. PATENT DOCUMENTS

| | | | | |
|---|---|---|---|---|
| 5,557,724 A | | 9/1996 | Sampat et al. | 395/157 |
| 5,563,772 A | * | 10/1996 | Nichols | 361/752 |
| 5,574,725 A | | 11/1996 | Sharma et al. | 370/79 |
| 5,610,970 A | * | 3/1997 | Fuller et al. | 379/88.13 |
| 5,727,164 A | * | 3/1998 | Kaye et al. | 395/228 |
| 5,734,701 A | * | 3/1998 | Kuwabara et al. | |
| 5,787,278 A | * | 7/1998 | Barton et al. | 395/601 |
| 5,828,312 A | * | 10/1998 | Yamazaki | 340/825.44 |
| 5,854,774 A | * | 12/1998 | Timme | 368/10 |
| 5,892,535 A | * | 4/1999 | Allen et al. | 348/9 |
| 6,223,293 B1 | * | 4/2001 | Foster et al. | 713/300 |

* cited by examiner

| START TIME | FUNCTION | END TIME | FUNCTION |
|---|---|---|---|
| 8:00 AM | ATM2 | 11:30 AM | ATM0 |
| 1:00 PM | ATM1 | 5:00 PM | ATM0 |
| | | | |

SCHEDULED AUDIO MODE FOR MODEM SPEAKER

FIELD OF THE INVENTION

The present invention relates in general to methods and apparatus for controlling a modem, and particularly to activation and deactivation of modem features.

BACKGROUND OF THE INVENTION

Computers are becoming ubiquitous in every aspect of daily life. One reason for this is because having a computer so expands the ability to communicate, gather and exchange information. While a portion of the computer-to-computer communication is performed over network circuitry, a very large portion is still performed over telephone lines, using modems as the interface between the computer and the telephone system. Most modems include an audio aspect, such as a speaker. The speaker allows the user to monitor the status of a call-in-progress by amplifying a dial tone and tones corresponding to numbers dialed. In addition, a carrier tone is also played from a modem speaker while two modems negotiate establishing a session. There are times, however, when the user wishes to suppress sounds generated by the modem. For example, when a person is working at home in the evening, the modem noise may disturb those who have gone to sleep or are pursuing some other household task. Some users use their computer and modem as a fax machine and always leave it on. Mail programs can be set to dial out periodically to receive mail or other data. Receipt of a fax or dialing out in the middle of the night could result in loud carrier tones and information exchanges. In another example, where a number of computers are being used in a limited area (such as a computer lab in a school or library, or in a hospital ward or business office), if each modem were broadcasting sounds indiscriminately, the resulting cacophony could become quite disruptive.

The standard command language used in most conventional modems available today provides a partial solution to this problem. These commands, referred to as 'AT' (for attention code) commands, control the operating characteristics of the modem. In conventional systems, this is the method by which a user activates or deactivates the audio capabilities of a modem. For example, keying 'ATM0' sets the speaker always off, keying 'ATM 1' sets the speaker on until the modem detects carrier, and keying 'ATM2' sets the speaker always on. A speaker is deemed to be on when audio signals are being sent to it, and off, when audio signals are not being sent to it. Whether the user is keying the commands directly to the modem or through a communications application, however, this method is limited in that the user must anticipate when the speaker needs to be deactivated and then remember to reactivate the modem's speaker at a later time. In some situations this requires the itinerant user to know the schedule for reduced noise periods at a location which they may have only visited once or twice. For the user who is on the computer for extended periods of time, they must keep track of the time so that they do not forget to turn off the speaker at the proper time or turn it back on when the quiet time has passed. Many users may decide to just leave the speaker off all of the time rather than constantly remembering to turn the speaker off and on. This is not an acceptable option, as it prevents the user from employing the full extent of the modem's features. What is needed is a way to schedule the activation of the audio aspect of a modem according to user or environmental requirements.

SUMMARY OF THE INVENTION

The present invention overcomes limitations in conventional systems, providing a method and apparatus for selectively configuring a modem to change its audio output setting. In one embodiment, activation and deactivation of signals provided to a speaker are performed in accordance with a schedule. In one embodiment a modem control system comprises a computer system. The computer system further comprises a memory, a system clock, a central processor, a user interface and display, and a modem. The modem is communicatively coupled to the computer. The modem control system comprises a speaker communicatively coupled to the modem, a schedule table for storing a schedule of modem speaker commands used to control audio signals. An activation module uses the schedule for activating and deactivating signals to the speaker according to the schedule.

In a further embodiment the schedule comprises a plurality of rows, each row containing a start time and an end time indicating when the modem speaker should be activated or deactivated. In another embodiment, the activation module uses a real-time clock to issue a plurality of interrupts, wherein each of the plurality of interrupts results in a modem control command being issued by an interrupt service routine.

In one embodiment the real-time clock is the system clock, while in an alternate embodiment the real-time clock is a device incorporated in the modem's circuitry.

In yet another embodiment the modem control system comprises a user interface for modifying the schedule. In one embodiment the user interface comprises a user-activated mechanism for enabling and disabling the activation module.

In one embodiment the modem is a PCMCIA device, while in another embodiment the modem is a stand-alone device.

In one aspect of the invention, a method automatically controls signals to be sent or not sent to a speaker associated with a modem. The method comprises the steps of creating a schedule of when the speaker signals are to be activated or deactivated, loading the schedule into a real-time clock, generating one or more interrupts, the one or more interrupts generated according to the schedule. For each of the one or more interrupts, the modem speaker signals are activated or deactivated according to the information in the schedule.

In yet another embodiment, a method for automatically controlling signals sent to a speaker associated with a modem comprises the steps of creating a schedule of when the speaker signals are to be activated or deactivated. According to this method, each time the modem is accessed, a current time is obtained from a clock, the entries in the schedule are compared to the current time, and, if a match is found, the speaker signals are activated or deactivated according to the found schedule entry.

In a further embodiment the schedule is stored in the computer's memory, while in another embodiment the schedule is stored in a separate memory device.

According to another embodiment of the present invention, a computer readable storage device embodies program code for causing a computer to schedule interrupts in accordance with a clock device. The program code monitors the clock device, and when one of the interrupts matches the current time, the program code issues the interrupt, thereby applying a modem setting contained in the issued interrupt. Each of the plurality of interrupts identifies a particular modem setting.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in detail sufficient to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Figure 1:
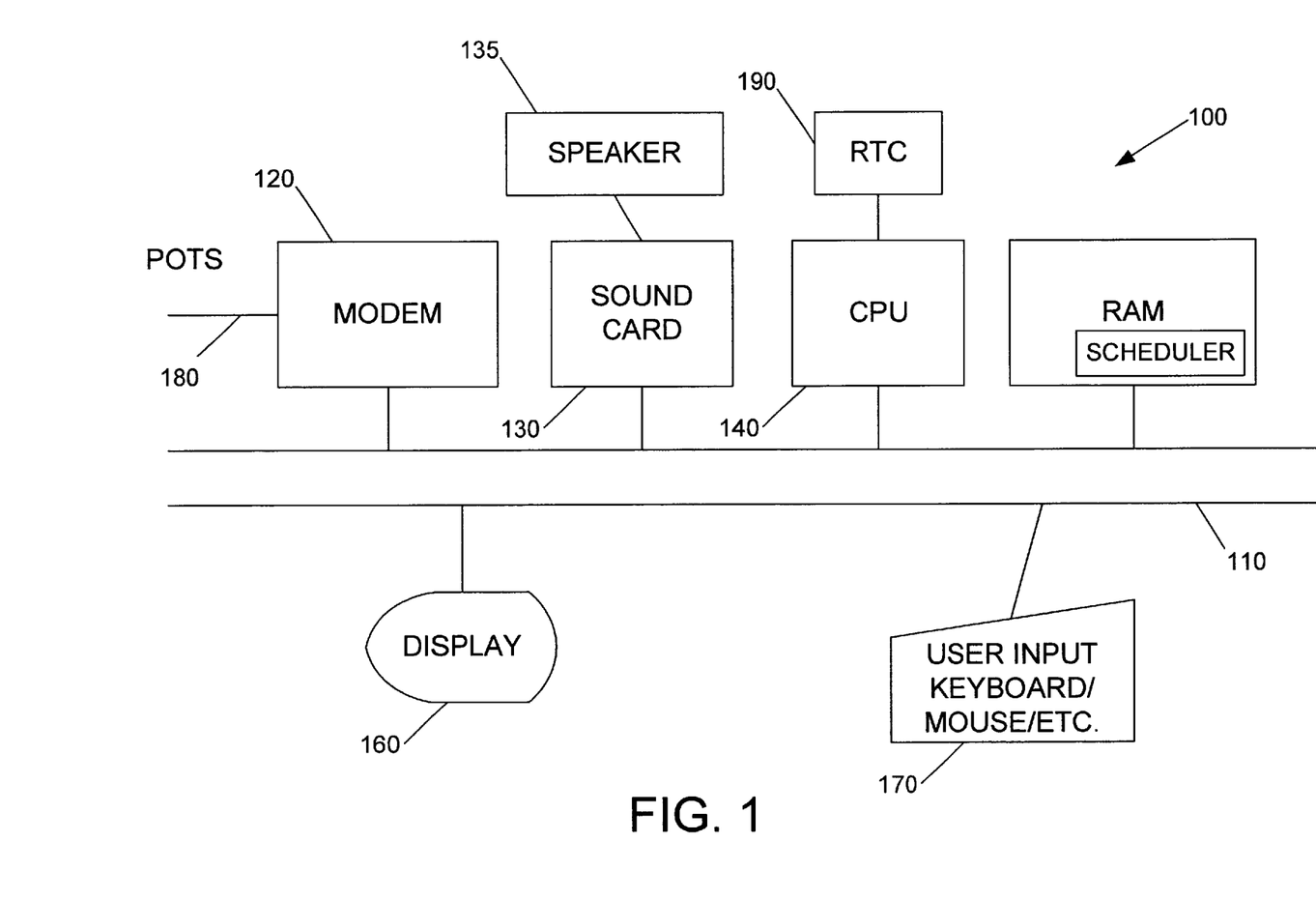
FIG. 1 is a block schematic diagram of the major components of a computer system incorporating the present invention.

FIG. 1 shows a block schematic diagram of the major components of a conventional computer system. Central processing unit (CPU) 140 resides on a system board containing an industry standard PCI bus 110. A memory 150 is coupled to both the processor 140 for direct access, and to PCI bus 110 for direct access by other components also coupled to PCI bus 110. Memory 150 is a simplified representation of a hierarchy of memory and permanent storage, such as a RAM, CDROM, tape or a magnetic disk drive to name a few are used in a well-known manner to permanently store data and programs which are executed by CPU 140. Many different forms of memory devices may be used to both store programs and make them available for execution by CPU 140, and the invention is not limited by any particular arrangement of memory devices.

The user interacts with the computer via user input 170 (which may be any combination of a keyboard, pointing device or other conventional user input mechanism) and monitor 160. In the embodiment shown, a sound card 130 (which drives a speaker 135) and a modem 120 are also coupled to PCI bus 110, usually through serial ports which may be coupled to the PCI bus 110 through an ISA bus, PCMCIA bus or other type of bus. PCI bus 110 is a simplified representation of such bus structures. The operation of and interaction between conventional computer system components is well-known. Those skilled in the art will also recognize that other configurations of components, including multiple processors, different memory organizations and bus structures are possible without exceeding the scope of the present invention.

Computer 100 also comprises a real-time clock 190 operative coupled to processor 140. A preferred type of real-time clock to be used in this embodiment is a low-power device providing time-of-day and multi-year calendaring functions, and may optionally include alarm features. Such real-time clocks are commonly known and used in devices such as watches, computers, and video cassette recorders. One example of such a device is the low power real-time clock sold by Benchmarq Microelectronics, Inc. (product specification bq3285). Real-time clocks used in watches generally provide single-event scheduling, while those used in computers support scheduling the activation of multiple events. A preferred embodiment of the present invention incorporates a real-time clock similar to those used in many common computer systems, supporting activation and deactivation of system functions based on a time-based schedule. It should be noted that the system of the invention can incorporate any one of these or similar real-time clocks without departing from the spirit or scope of the invention.

Figure 2:
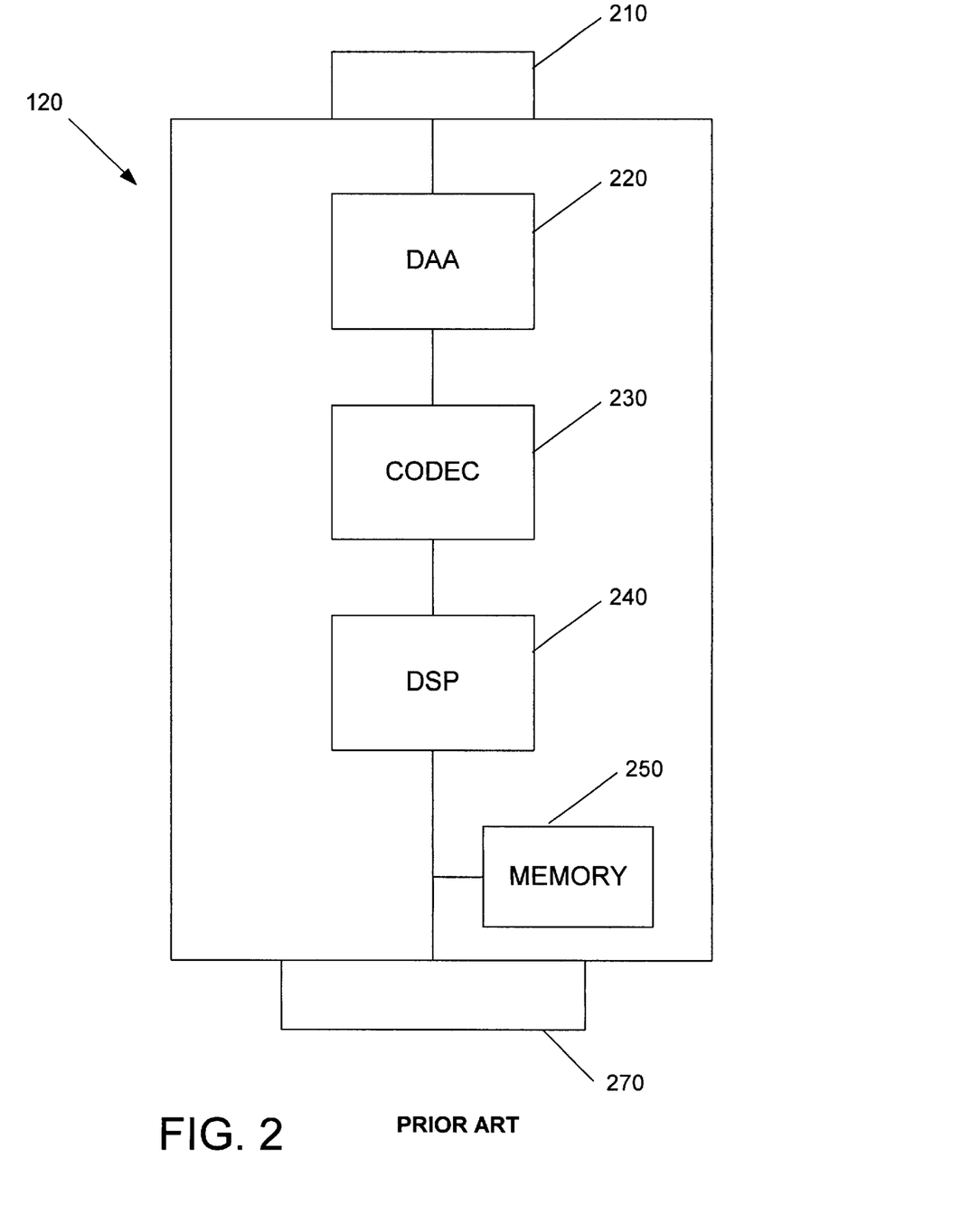
FIG. 2 is a block schematic diagram of a PCMCIA card modem system incorporating the present invention.

In the embodiment shown in FIG. 1, modem 120 is communicatively coupled to PCI bus 110. Digital signals generated by the computer are processed by the modem so that they may be sent over a connection 180 such as POTS (plain old telephone system) or ISDN. In a similar manner, signals received from connection 180 are also processed by modem 120 for receipt by the computer. FIG. 2 shows a simplified block diagram of a conventional modem. Incoming and outgoing signals are passed to and from connection 180 through a telephone interface such as data access arrangement (DAA) 220. DAA 220 connects to connection 180 through a conventional connector 210 such as an RJ11 connector. Coder-decoder (CODEC) 230 and digital signal processor (DSP) 240 interface with DAA 220 in a well-known manner. A detailed description of a DSP, CODEC, and a telephone interface (viz., a DAA) in direct connection and cooperation with one another is described in the publication entitled "AT&T V.32bis/V.32/FAX High-Speed Data Pump Chip Set Data Book" published by AT&T Microelectronics, December 1991, which is hereby incorporated by reference. The AT&T data pump chip set described in this reference comprises the core of an integrated, two-wire full duplex modem which is capable of operation over standard telephone lines or leased lines, and is available from AT&T Microelectronics. Signals between the computer's PCI bus 110 and modem 120 are communicated via connector 270. When modem 120 takes the form of a stand-alone device, connector 270 is a conventional RS-232 connector. When modem 120 is PCMCIA device, connector 270 is a conventional 68-pin host adapter socket.

When modem 120 is a PCMCIA device, it interacts with system speaker 135 in essentially the same manner as a standalone modem interacts with the dedicated speaker included in the standalone modem's circuitry. For purposes of simplifying the following discussion, references to the "modem speaker" are intended to include both situations. Where the modem employs the system speaker, any modem settings with respect to the speaker do not interfere with other systems' use of the speaker. For example, when a modem command is issued to turn off the speaker, it logically turns off the speaker so that the modem signals are not audiblized, but sounds from other applications and/or devices are still issued by the system speaker.

Also included in the modem circuitry is memory device 250. In one embodiment memory device 250 is an electrically erasable programmable read only memory (EEPROM) device. Modem settings in effect while modem 120 is on are held in memory device 250. These settings are changed by issuing AT commands to modem 120. The user may access modem 120 directly and key in AT commands. Alternatively, various communications-oriented applications provide an interface for changing modem settings interactively through a user interface executing on a computer. In conventional systems, the modem settings remain constant until the user manually changes them.

One of the novel features provided by the system of the invention is an automatic scheduler for automatically controlling whether audio signals are sent to the modem speaker. According to one embodiment of the present invention, a user can establish a schedule for selectively configuring the modem to change an audio output setting of the modem. Essentially, commands are issued at selected times for logically activating and deactivating the modem speaker by controlling audio signals sent to the speaker, and thereby avoid having to remember to change the status manually. The automatic scheduler schedules interrupts which, when issued, result in the generation of a modem command, logically setting the modem speaker either on or off. In an alternate embodiment, each time the modem is activated, whether it be by an incoming or outgoing call, the automatic scheduler checks to see if the speaker associated with the modem should be on or off. The scheduler then issues the appropriate 'AT' command to the modem. In one embodiment the scheduler issues the activate/deactivate command for each modem access, while in an alternate embodiment the scheduler retains information on the current status of the modem, issuing an activate/deactivate command only when it is a status change. It should be noted that the activate/deactivate commands control what audio signals are sent to the modem speaker. They do not necessarily physically turn the speaker on and off. Hence, when referring to a speaker being turned on or off, it is understood that such terms are representative of the user perception of whether or not sound will emanate from the speaker.

The commands used to configure the modem speaker comprise selected commands from the basic Hayes 'AT' command set. This comprise at least an Ln command, where n=0 refers to low speaker volume, 1 refers to low speaker volume, 2 refers to medium and 3 to high speaker volume is used to activate the speaker. An Mn command is used to at least deactivate the speaker. When n=0 the speaker is turned off, n=1 means the speaker is on until the carrier is detected, n=2 leaves the speaker always on, and n=3 leaves the speaker off during dialing of numbers.

According to one embodiment of the present invention, the automatic scheduler is a software application stored in memory 150. Through user input device 170 and as aided by displayed information about the schedule on monitor 160 the user is able to schedule the activation and deactivation of the modem's audio output. The automatic scheduling program can be in one of two states—enabled or disabled. It is toggled between the two states by manipulating either a series of one or more keystrokes on user input device 170 or an icon displayed on monitor 160. The user may at any time manually override the automatic scheduler by activating or deactivating the modem speaker using conventional methods.

Figure 3:
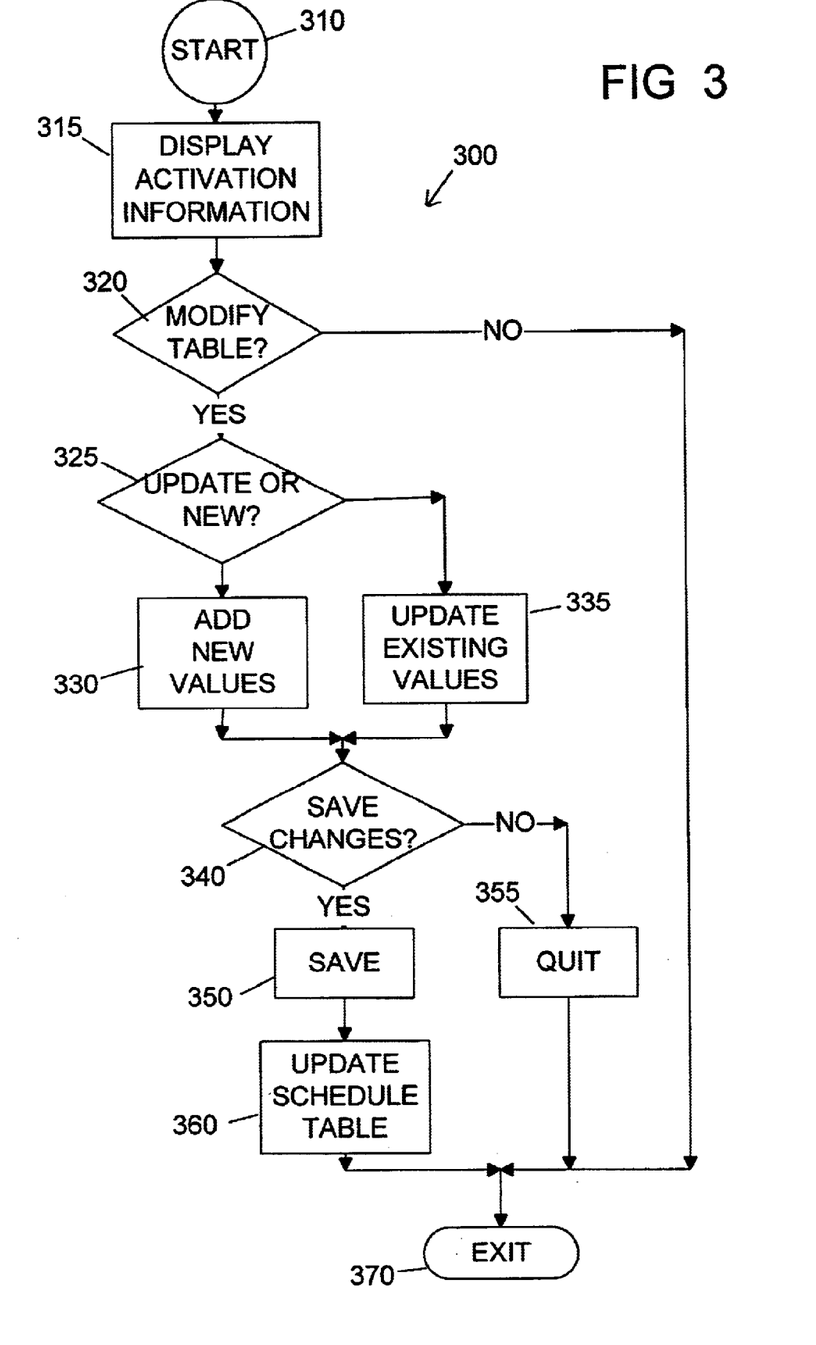
FIG. 3 is a logic flow diagram of the main steps followed by an automatic scheduler according to one embodiment of the present invention.

In one embodiment, scheduling information is stored in memory 150 according to the process represented in the flow chart shown in FIG. 3. The process is initiated at block 315 when the user accesses activation table 500 (shown in FIG. 5) through an interface displayed on monitor 160. The user then decides at block 320 whether they wish to modify the schedule table. If they do not, the program ends. If they wish to make modifications, the user decides at block 325 to either enter new values (block 330) or modify existing values (block 335).

Figure 4:
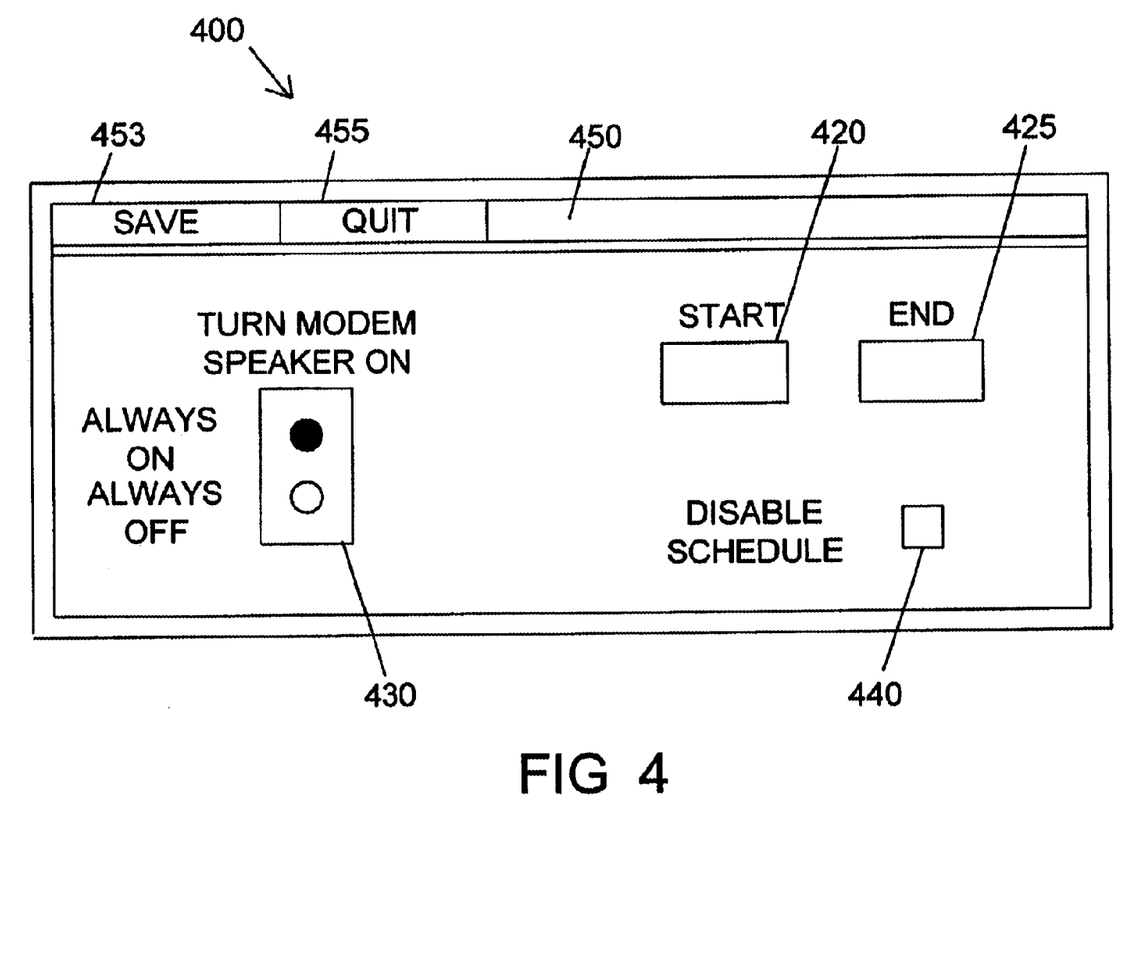
FIG. 4 is a block representation of a user interface for updating schedule information according to one embodiment of the present invention.
Figure 5:
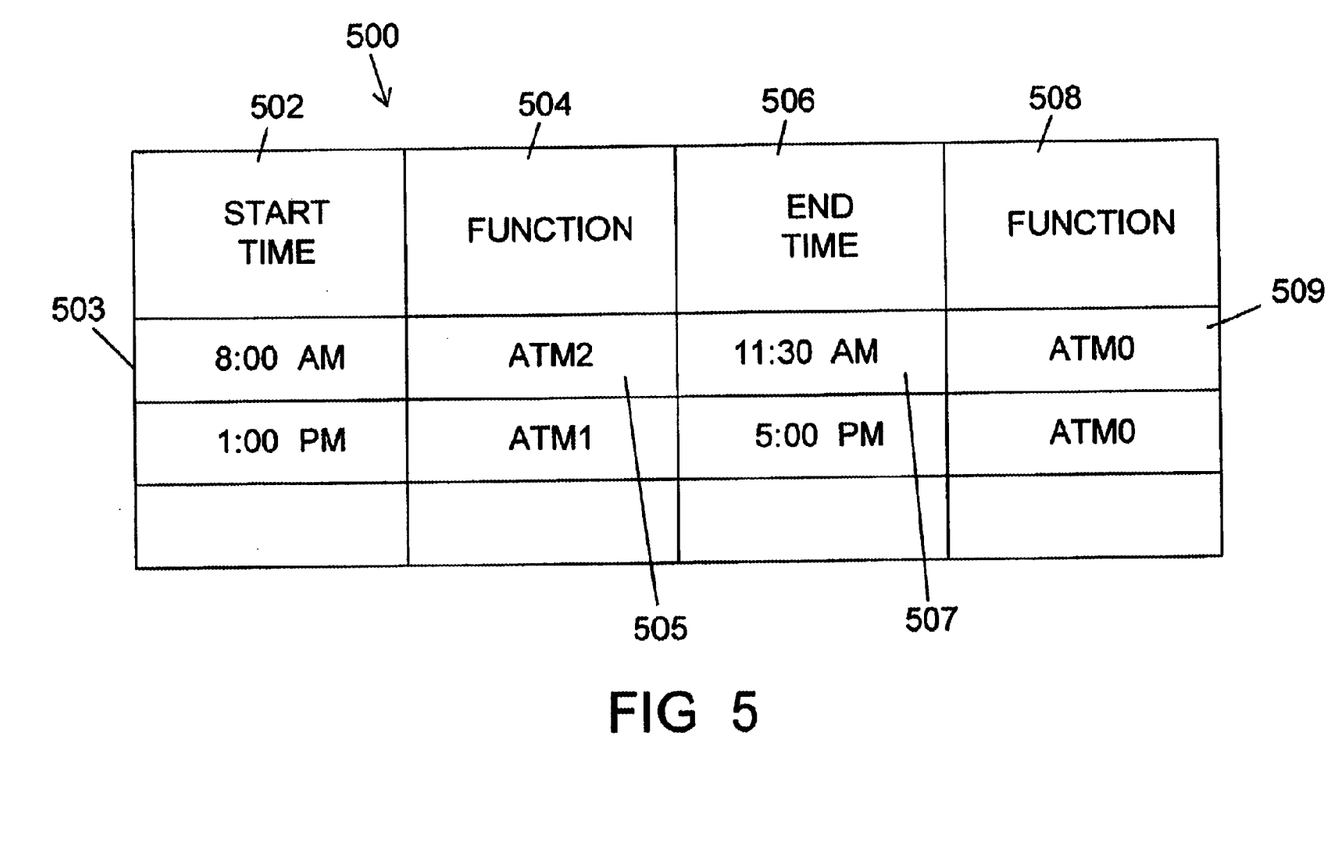
FIG. 5 is a logical representation of an activation schedule table.

One representative example of an interface for accessing activation table 500 is shown in FIG. 4. In that example, the user identifies the start and end times (420, 425) when the modem speaker is to be activated. The time may be entered in 12- or 24 hour format. In one embodiment, during all unspecified time periods the automatic scheduler will recognize that the modem speaker is to be deactivated. Thus when a start time is encountered, the modem speaker is activated, and when an end time is encountered the modem speaker is deactivated. One skilled in the art will recognize that the times in the schedule could as easily be interpreted to indicate specific times in which the modem speaker is to be deactivated, and that the modem speaker is to be activated during all other time periods. According to the embodiment illustrated in FIG. 4, the user also has the option of setting the modem speaker always on or always off by selecting one or the other option 430. Once all the desired modifications are made, at block 340 the user must decide to either save the modifications or retain the existing activation table values. If the user wishes to retain the existing values and ignore any changes, they exit the program by selecting 'Quit' from the menu bar (block 355) and no modifications are applied to the activation table. If, on the other hand, they wish to apply their modifications, they select 'Save' from the menu bar (block 350) and activation table 500 is updated with the new values (block 360).

Further representative examples of interfaces which could be used for accessing activation table 500 comprise common scheduling programs such as OutLook or Schedule+by Microsoft Corporation.

According to one embodiment, the automatic scheduling program includes logic which programs real time clock 190 according to the scheduling information. This process is also described in more detail below. In an alternate embodiment, modem 120 includes a real-time clock similar to that incorporated in computer 100 within the modem circuitry. In this embodiment the automatic scheduler schedules interrupts in the modem's clock for controlling the activation/deactivation of the modem speaker according to a schedule.

When the user initiates the automatic scheduler, they are presented with a data input window. FIG. 4 shows one embodiment of an automatic scheduler window 400. In the embodiment shown, if the user wishes to schedule a modem speaker activation period they key a start time and end time for the desired period in the "start" and "end" fields 420, 425. They may enter more than one schedule, where each schedule comprises a set of one start and one end time. When they have entered all the data, they may save their entries by selecting the "save" option 450 from menu bar 450. Schedule data saved in this manner is stored in schedule table 500 (described in more detail below), which in one embodiment is held in the computer's memory 150. If they decide not to save the periods they have scheduled they select "quit" 455 instead. According to this embodiment, the user also has the option to disable the automatic scheduler by setting switch 440. When the automatic scheduler is disabled there are no interrupts generated based on the schedule 500, and the modem speaker must be activated and deactivated according to conventional methods. In the embodiment illustrated in FIG. 4 the user also has the option 430 to override the schedule during any scheduled period and set the modem speaker to be in a state different than the one scheduled for that time. In one embodiment the override function is released at the next scheduled modem state change, while in another embodiment the override function remains in effect until it is specifically removed.

FIG. 5 illustrates one embodiment of an activation schedule table 500 according to the present invention. In the embodiment shown, there is one row of information stored in activation schedule table 500 for each time the modem speaker is to be activated. Each row of information contains the start time 502, the modem function 504 which is to be applied at the designated start time 502, the end time 506, and the function 508 to be executed at the end of the activation period designated by end time 506. The modem functions control the type of output sent to the speakers for audio presentation.

The format for the start time 502 and end time 506 is, in one embodiment, restricted to 12-hour notation, but one skilled in the art will recognize that other embodiments incorporating other time formats such as 24-hour notation are within the scope and spirit of the present invention. In the example shown in FIG. 5, at start time 8:00 AM 503 the function ATM2 505 (which sets the modem speaker always on) is executed. At end time 11:30 AM 507 the function ATM0 509 (which sets the modem speaker always off) is executed. One skilled in the art will recognize that other combinations of information and other record layouts are possible within the scope of the present invention. In the embodiment shown, the functions comprise the well-known set of 'AT' commands for controlling the operating characteristics of a modem in a well-known manner. The "Ln" commands/functions previously discussed can also be used to specify the output to the speaker at both the start time 502 and the end time 506. It should be noted, that if a different command is not provided at the end time, the output to the speaker will remain as set at the start time 502. One can specify a default end time command if desired.

In another embodiment, the values held in start time 502 and end time 506 are in date-time format, providing greater control for the user in scheduling modem speaker activations. In a further embodiment table 500 retains only start time 502 and end time 506. This embodiment minimizes the logic incorporated in the automatic scheduler because it does not have to interpret a function at each start and end time in order to determine what modem command to issue. Instead, the application is written so an ATM1 or an ATM2 command (setting the modem speaker on until carrier is detected or always on, respectively) is automatically associated with the value placed in the start time field. Similarly, an ATM0 command (which sets the modem speaker always off) is automatically associated with the value placed in the end time field. In one embodiment, the choice of 'ATM1'or ' ATM2' is made through modifying application parameters which take effect when the system is initialized. In another embodiment the user has the option to select one or the other command through a "preferences" menu screen provided as part of the user interface.

Figure 6:
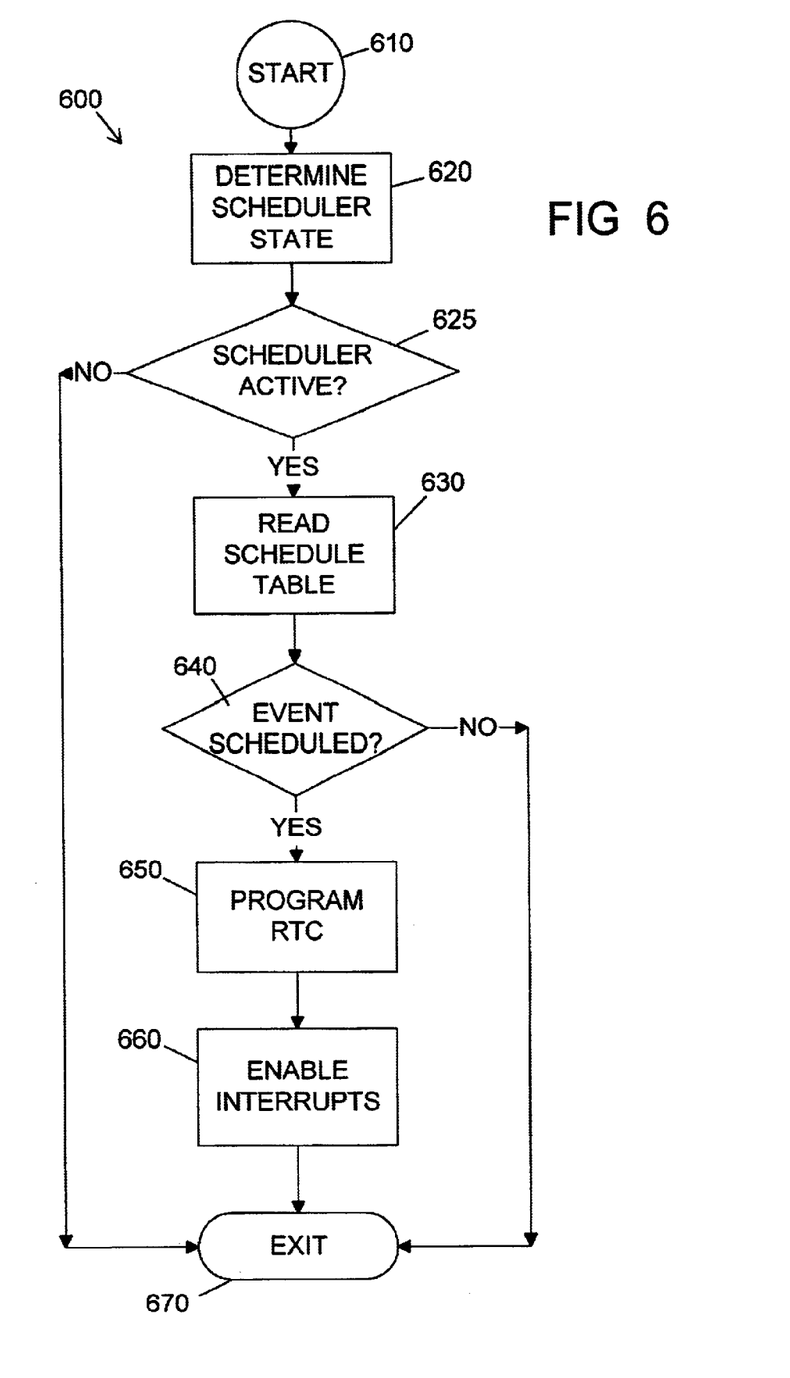
FIG. 6 is a logic flow diagram of the steps followed when modifying the contents of an activation schedule table according to one embodiment of the present invention.

FIG. 6 is a flow chart of the automatic scheduler logic 600 which CPU 140 executes when processing the information stored in activation table 500. The scheduling logic is initiated at block 610 when computer 100 is started. First the state of the automatic scheduler is evaluated at block 620. If the automatic scheduler is in the disabled state (block 625), the scheduler exits 670 without attempting to modify the modem settings. If the automatic scheduler is active (the default state), then at block 630 the logic reads through activation table 500. If there is not at least one future event defined (block 640) then the scheduler exits 670. If one or more future events are defined (block 640) then at block 650 the next event in chronological order is programmed into real time clock 190. Next the logic enables interrupts at block 660, such that the scheduled events activate or deactivate the modem speaker, according to their content, when they are triggered by real time clock 190.

Figure 7:
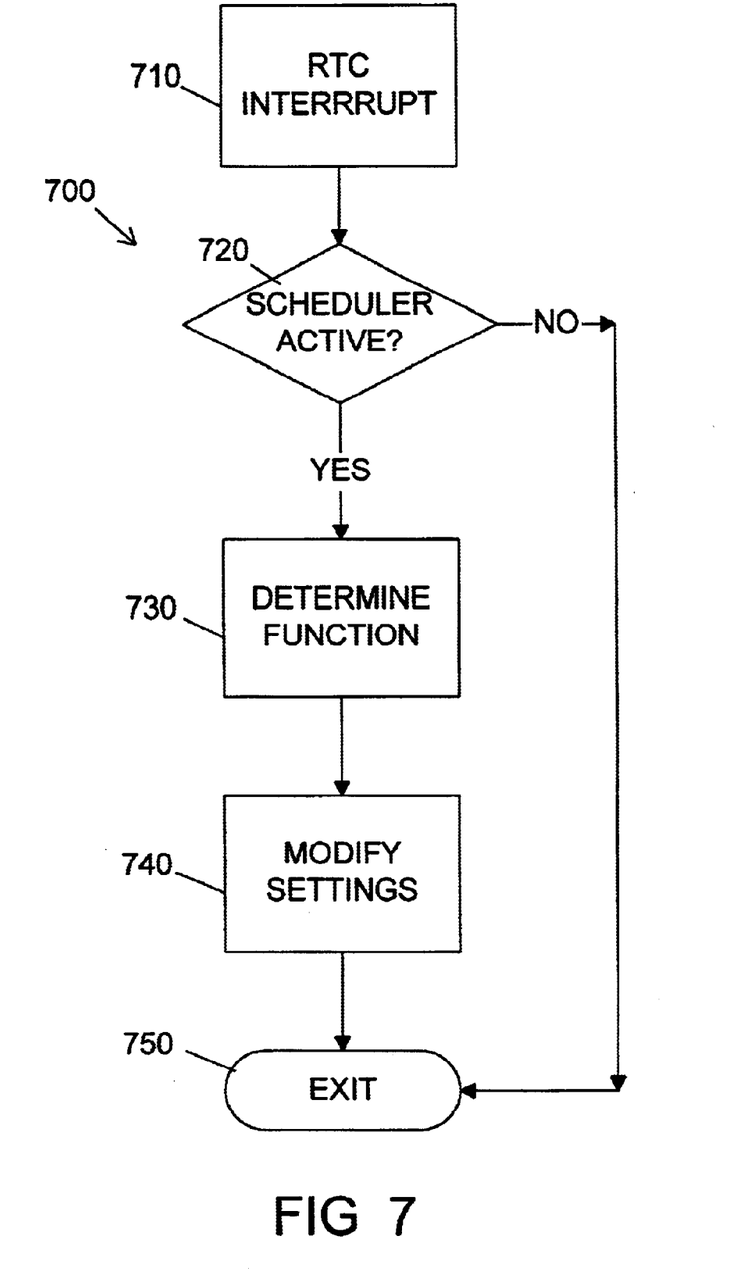
FIG. 7 is a logic flow diagram of steps followed to generate a real-time clock interrupt.

FIG. 7 is a flow chart 700 of how the automatic scheduler processes interrupts triggered by a real time clock. At block 710 the process is initiated by real time clock 190 triggering an interrupt. When the interrupt is received by CPU 140 it checks to see if the automatic scheduler is active (block 720). If it is not active no further processing is done with regard to the interrupt. If the automatic scheduler is active, it translates the function value (block 730) associated with the activation table entry which was the basis for the interrupt, generating the appropriate AT command. In the embodiment where activation table 500 contains only periods when the modem speaker is enabled, the automatic scheduler identifies whether the interrupt was a start time or an end time. If it was a start time the automatic scheduler activates the speaker, and if it was an end time it deactivates the speaker. Once the appropriate AT command is determined, the automatic scheduler generates that AT command at block 740 and transmits it to the modem, thereby changing the modem speaker setting. In an alternate embodiment, the automatic scheduler is accessed each time the modem is activated. The automatic scheduler compares the current real-time clock value to the entries in schedule table 500, and at block 740 to determine whether the modem should be active or inactive, and accordingly issues the necessary AT command to set the modem speaker.

The user is able to override the automatic scheduler at any time and activate or deactivate the modem speaker using conventional manual procedures. Manual override will change the current state of modem 120 but will not affect subsequent operation of other programmed activities so long as the automatic scheduler remains active. The automatic scheduler logic allows the user to better manage the noise level generated by modem 120 by automatically controlling when the modem speaker is turned on. The ability to so schedule the automatic initiation of future volume modifications increases user convenience. This ensures the sound level is down when it has to be but returned to normal levels whenever possible.

It is to be understood that the above description is intended to be illustrative, and not restrictive. Many other embodiments will be apparent to those skilled in the art upon reviewing the above description. The scope of the invention should, therefore, be determined with reference to the appended claims, along with the full scope of equivalents to which such claims are entitled.

What is claimed is:

1. A computer system comprising:

a modem capable of providing audio data;

a modem speaker providing audio signals responsive to said audio data; and a modem controller including an activation module for automatically selectively configuring the modem to change said audio data provided to the modem speaker, wherein the audio signals indicate a negotiation for establishing a connection between the modem and another device.

2. The computer system of claim 1, and further comprising a clock, wherein the clock triggers interrupts according to a schedule.

3. The computer system of claim 2, wherein each of the interrupts causes the activation module to generate a modem control command to configure the modem.

4. A computer system comprising:

a modem capable of providing audio data;

a modem speaker providing audio signals responsive to said audio data;

a modem controller including an activation module for automatically selectively configuring the modem to change said audio data provided to the modem speaker, wherein the audio signals indicate a negotiation for establishing a connection between the modem and another device; and a user interface for modifying a schedule.

5. The computer system of claim 4, wherein the user interface further comprises a user-activated mechanism for enabling and disabling the activation module.

6. The computer system of claim 4, wherein the user interface further comprises a user-activated mechanism for overriding the activation module.

7. The computer system of claim 1, wherein the modem is a PCMCIA device.

8. A method of automatically controlling an audio data output setting of a modem, the method comprising:
creating a schedule of times when the audio data output setting of the modem is to be modified, the schedule including the desired setting associated with each time, wherein the audio data output setting controls audio data provided to a modem speaker of the modem such that the audio data modifies audio signals produced by the modem speaker and, wherein the audio signals indicate a negotiation for establishing a connection between the modem and another device;
controlling the audio data output setting of the modem based on the schedule of times.

9. The method of claim 8, and further comprising storing the schedule in a memory.

10. The method of claim 8, wherein creating a schedule of times comprises creating a plurality of schedule entries, wherein each schedule entry comprises a start time, an end time, and a modem control command associated with each time.

11. A method for automatically controlling a modem speaker coupled to a modem, the method comprising:
creating a schedule of when the modem speaker is to transmit audio signals, wherein the audio signals indicate a negotiation for establishing a connection between the modem and another device; and
each time the modem is accessed, performing:
obtaining a current time from a clock;
comparing entries in the schedule to the current time; and
if a match is found, activating or deactivating the modem speaker according to the found schedule entry.

12. The method of claim 11, and further comprising storing the schedule in memory.

13. The method of claim 11, wherein creating a schedule comprises identifying a start time for each time the modem speaker is to transmit audio signals.

14. A computer readable storage device having program code embodied therein for causing a computer to perform a method comprising:
scheduling a plurality of interrupts, wherein each interrupt identifies a particular setting for a modem;
determining a current time by reading a clock;
triggering one of the plurality of interrupts if its schedule matches the current time; and
issuing a command to apply the modem setting identified in the triggered interrupt, wherein the modem setting modifies modem audio signals, wherein the modem audio signals indicate a negotiation for establishing a connection between the modem and another device.

15. A computer readable storage device having program code embodied therein for causing a computer to perform a method comprising:
scheduling a plurality of interrupts, wherein each interrupt identifies a particular setting for a modem;
programming a clock with the schedule;
triggering an interrupt from the clock when the interrupt's scheduled time is reached by the clock; and
issuing a command to apply the modem setting identified in the received interrupt, wherein the modem setting modifies modem audio signals, wherein the modem audio signals indicate a negotiation for establishing a connection between the modem and another device.

16. A communication system, comprising:
a computer, the computer comprising a memory, a system clock, a central processor, a user interface and a display;
a modem, the modem communicatively coupled to the computer;
a modem speaker communicatively coupled to the modem;
a schedule table for storing a schedule of when the modem speaker is to transmit audio signals, wherein the audio signals indicate a negotiation for establishing a connection between the modem and another device; and
an activation module for controlling transmission by the modem speaker by the modem according to the schedule.

17. The communication system of claim 16, wherein the activation module schedules the system clock to trigger a plurality of interrupts according to the schedule.

18. The communication system of claim 17, wherein each of the plurality of interrupts comprises a modem control command.

19. The communication system of claim 16, wherein the modem comprises a programmable clock, and wherein the activation module schedules the programmable clock to trigger a plurality of interrupts according to the schedule.

20. The communication system of claim 16, wherein the schedule is stored in the computer memory.

21. A communication system, comprising:
a computer, the computer comprising a memory, a system clock, a central processor, a user interface and a display;
a modem, the modem communicatively coupled to the computer;
a modem speaker communicatively coupled to the modem;
a schedule table for storing a schedule of when the modem speaker is to transmit audio signals, wherein the audio signals indicate a negotiation for establishing a connection between the modem and another device; and
an activation module for controlling transmission by the modem speaker by the modem according to the schedule; and
a user interface for modifying the schedule.

22. The communication system of claim 21, wherein the user interface further comprises a user-activated mechanism for enabling and disabling the activation module.

23. The communication system of claim 21, wherein the user interface further comprises a user-activated mechanism for overriding the activation module.

24. A modem controller for a modem, the modem controller comprising:
a modem speaker coupled to the modem, the modem speaker providing audible signals responsive to the modem, wherein the audible signals indicate a negotiation for establishing a connection between the modem and another device;
a clock; and
an activation module coupled to the modem speaker and to the clock, the activation module for activating the modem speaker according to a time-of-day schedule.

25. The computer system of claim 1, wherein the activation module selectively configures the modem to change said audio data provided to the speaker such that a level of volume of said audio signals is changed.

* * * * *